United States Patent [19]

Balzer et al.

[11] Patent Number: 4,457,373

[45] Date of Patent: Jul. 3, 1984

[54] PROCESS FOR OIL RECOVERY FROM SUBTERRANEAN DEPOSITS BY EMULSION FLOODING

[75] Inventors: Dieter Balzer; Kurt Kosswig, both of Marl, Fed. Rep. of Germany

[73] Assignee: Chemische Werke Huels, A.G., Marl, Fed. Rep. of Germany

[21] Appl. No.: 349,945

[22] Filed: Feb. 18, 1982

[30] Foreign Application Priority Data

Feb. 18, 1981 [DE] Fed. Rep. of Germany ....... 3105913

[51] Int. Cl.$^3$ .............................................. E21B 43/22
[52] U.S. Cl. ..................................... 166/274; 166/275; 252/8.55 D
[58] Field of Search ...................... 252/8.55 R, 8.55 D; 166/274, 275

[56] References Cited

U.S. PATENT DOCUMENTS

| | | | |
|---|---|---|---|
| 2,233,382 | 2/1941 | DeGroote et al. | 166/275 |
| 3,149,669 | 9/1964 | Binder et al. | 252/8.55 X |
| 3,208,515 | 9/1965 | Meadors | 252/8.55 X |
| 4,110,228 | 8/1978 | Tyler et al. | 161/275 X |
| 4,165,785 | 8/1979 | Schievelbein | 252/8.55 X |

OTHER PUBLICATIONS

Lepper, "Erdoel Ergas Zeitschrift", 92:426, (1976).
Balzer et al., Tenside Detergents, 16:256, (1979).

*Primary Examiner*—Herbert B. Guynn
*Attorney, Agent, or Firm*—Millen & White

[57] ABSTRACT

Extensively emulsion-free oil is recovered from a subterranean reservoir of medium or high salinity by forcing an emulsion, e.g., of oil, into an injection well. Carboxymethylated ethoxylate is utilized as the emulsifier and is selected so that the phase inversion temperature of the system:oil of reservoir/formation water/tenside/optional additives lies 0°–10° C. above the reservoir temperature.

12 Claims, No Drawings

PROCESS FOR OIL RECOVERY FROM SUBTERRANEAN DEPOSITS BY EMULSION FLOODING

BACKGROUND OF THE INVENTION

The present invention relates to a process for the recovery of oil by emulsion flooding wherein an anionic tenside is employed as the emulsifier.

In the extraction of oil from oil-bearing deposits, generally, it is possible only to recover a fraction of the originally present oil by means of primary extraction methods. In such procedures, the oil reaches the surface due to the natural reservoir pressure. After exhaustion of this primary energy, the oil yield can be increased by secondary measures. In this method, water is forced into one or several injection wells of the deposit, and the oil is pushed to one or several production wells and thereafter brought to the surface. This so-called water flooding as a secondary measure is relatively inexpensive and accordingly is frequently employed, but leads in many cases only to a minor increase in oil extraction from the deposit.

An effective displacement of the oil, which is more expensive but urgently required from an economic viewpoint because of the present scarcity of petroleum, can be accomplished by tertiary measures. These are understood to mean processes wherein either the viscosity of the oil is reduced and/or the viscosity of the flooding water is increased and/or the interfacial tension between water and oil is lowered.

Most of these processes can be classified either as solution or mixture flooding, thermal oil recovery methods, tenside or polymer flooding and/or as a combination of several of the aforementioned methods. Thermal recovery methods include the injection of steam or hot water and/or are accomplished as in situ combustion. Solution or mixture processes involve injecting a solvent for the petroleum into the deposit. The solvent can be a gas and/or a liquid.

Tenside flooding processes are based primarily on a strong lowering of the interfacial surface tension between oil and flooding water. These can be categorized in dependence on tenside concentration and in some cases on type of tenside and additives, among tenside-supported water flooding, customary tenside flooding (low-tension flooding), micellar flooding, and emulsion flooding. In some instances, especially in the presence of relatively high tenside concentrations, water-in-oil emulsions are produced having a markedly increased viscosity as compared with the oil. Thus, a purpose of the tenside flooding step also is a reduction in the mobility relationship, i.e., an increase in oil mobility. This is especially advantageous in case of oils whose viscosity is not very low. Thereby fingering and passage of the driven water is reduced and, thus, the degree of efficiency of oil displacement is raised.

Pure polymer flooding is based predominantly on the last-described effect of a more favorable mobility ratio between oil and the pursuing flooding water.

The mode of operation of emulsion flooding, on the one hand, is aimed at oil mobilization by lowering interfacial tension. The limiting case can be deemed to be a phase miscibility within the framework of microemulsion flooding. On the other hand, emulsion flooding is also based on improving the volumetric flooding effect by rendering the carrier permeability uniform. For this purpose, the more or less viscous emulsion penetrates preferably into the more permeable carrier strata and thus permits an improved coverage of the low-permeability zones by the following flooding medium. In the literature, this second effect is emphasized in most instances. Thus, U.S. Pat. No. 3,527,301 and German Pat. No. 1,234,646 describe the use of fatty alcohol or alkyl phenol ethoxylates as emulsifiers which permit the attainment of a marked increase in the degree of oil extraction.

These compounds, as is known, have the advantage of being compatible with salts, even with higher-valence metal cations. Fundamental laboratory tests on high-permeability artificial formations have shown, however, that when using these nonionic tensides in emulsion flooding, extremely high pressure gradients occur which render field utilization impractical (B. Höfling, "Erdoel-Erdgas-Zeitschr." [Petroleum-Natural Gas-News] 81:480 [1965]).

In many more recent processes, disclosed, for example, in DOS [German Unexamined Laid-Open Application] No. 2,456,860 or U.S. Pat. Nos. 4,192,382 and 4,194,563, complicated tenside mixtures are used as emulsifiers which are compatible even with waters of relatively high salinity if the temperatures are not too high. In part, the emulsions are formed in situ, the organic phase and the aqueous emulsifier solution being injected in succession into the formation. Tenside mixtures enabling the formation of optimum emulsions generally do not lower the interfacial tension between the oil phase and the water phase to a sufficient degree and therefore are unsuitable for mobilization of the residual oil (U.S. Pat. No. 4,184,549). Consequently, in the above-mentioned conventional methods still other tensides or tenside mixtures are required for emulsion flooding in addition to the tenside mixtures which are effective as the emulsifiers. The other tensides or tenside mixtures effect oil-mobilization due to their high surfactant activity. Considering the fact that varying tenside molecules interact in various ways with the rock surface, it can certainly be assumed that the composition of the tenside mixture during transport through the formation will constantly change. As a result, there is a loss of the careful adaptation of the tenside combination to the properties of the reservoir.

An optimum process for emulsion flooding, therefore, has as a prerequisite, a maximally uniform tenside as emulsifier, which enables the formation of stable emulsions and, furthermore, adequately lowers the interfacial tension of the water/reservoir oil interface and thus is oil-mobilizing.

Furthermore, the tenside must be compatible with water of relatively high salinity; especially the presence of alkaline earth metal ions must not exert a very negative influence. The tenside must be thermally stable over long periods of time and is to be absorbed on the rock surface, under reservoir conditions, only to a minor extent. Of course, no pressure gradients uncontrollable under practical conditions must occur during emulsion flooding.

SUMMARY OF THE INVENTION

Accordingly, it is an object of the present invention to provide such an emulsion flooding process.

Upon further study of the specification and appended claims, further objects and advantages of this invention will become apparent to those skilled in the art.

These objects have been achieved by providing a process for recovering extensively emulsion-free oil from a subterranean deposit of medium or high salinity (e.g., 10,000-250,000 ppm total salt content) comprising injecting an emulsion into an injection well, wherein the emulsifier is a carboxymethylated ethoxylate of the formula $$R-(OCH_2CH_2)_n-OCH_2-COOM$$

wherein
R is a linear or branched aliphatic residue of 6-20 carbon atoms or an optionally disubstituted alkyl-aromatic residue of 3-14 carbon atoms in the alkyl group,
n is 1 to 30, and
M is an alkali or alkaline earth metal ion, or ammonium, which emulsifier is selected so that the phase inversion temperature of the system deposit oil/-formation water/tenside/optional additives lies 0°-10° C. above the deposit temperature.

DETAILED DISCUSSION

Carboxymethylated alkyl or alkylaryl ethoxylates possess good compatibility even with extremely high-salinity reservoir waters (e.g. 250,000 ppm total salinity). Their thermostability has been determined by numerous long-term tests. Their production is simple and economical. The oil-mobilizing effect in reservoir systems of medium and high salinity (10,000-250,000 ppm total salt content) is very good (H. J. Neumann, DGMK BERICHTE [DGMK Reports], Report No. 164 [1978]; D. Balzer and K. Kosswig, Tenside Detergents, 16:256 [1979]).

They are compatible with waters of high salinity of up to 250 g/l of total salt content, and in this connection alkaline earth metal ions can also be present. It has even been found that an amount of 2 g/l to 15 g/l of alkaline earth metal ions (calculated as $Ca^{2+}$) is very beneficial to the process.

These compounds are also disclosed for use in other recovery processes in commonly assigned copending applications Ser. No. 300,427 and 300,547, both of Sept. 9, 1981 and Ser. No. 349,947, filed on even date, whose disclosures are incorporated by reference herein.

It has been found surprisingly that these compounds, in the presence of reservoir waters of high salinity and crude oil or hydrocarbons, permit the formation of stable emulsions and that the latter, injected into a model formation containing residual oil, produce an extensively quantitative oil extraction. The amounts of tenside required in this mode of operation were significantly lower than in normal tenside flooding wherein carboxymethylated alkyl or alkylaryl ethoxylates, dispersed in reservoir water, are injected, e.g., in the mentioned commonly assigned applications. It was furthermore very surprising that this emulsion flooding method also yielded excellent oil extraction results with the use of carboxymethylated ethoxylates having a degree of carboxymethylation of almost 100%. Thus, a practically purely anionic, relatively uniform tenside has been discovered which in emulsion flooding can take over all decisive functions.

As compared with practically all processes for emulsion flooding described in the literature, the carboxymethylated ethoxylates with a degree of carboxymethylation of almost 100% as emulsifiers possess the great advantage of uniformity. There is only an extremely low probability of a chromatographic separation of the tenside mixture into its ionic and nonionic components with its attendant uncontrolled alteration of the phase relationships during transport of the tenside slug from the injection probe to the production probe.

Another advantage of this process resides in that there are no uncontrollably high pressure gradients, provided the tenside is properly adapted to the reservoir characteristics. A criterion of this adaptation is the phase inversion temperature (PIT) of the injected emulsion as well as of the reservoir system: crude oil/formation water/tenside/ optional additives. The values of this temperature are to lie 0°-10° C. above the deposit (reservoir) temperature.

The phase inversion temperatures (PIT's) are conventionally determined by measuring electric conductivity. For this purpose, an emulsion consisting of the crude oil (optionally, living oil) and the formation water of the respective reservoir (phase ratio 1:1) and the tenside (2-5%, based on the aqueous phase) as well as optional additives, is prepared. If the emulsion to be injected per this invention for purposes of tertiary oil extraction is of a different composition, wherein, for example, the difference may lie solely in the oil phase, then this emulsion must likewise be taken into account in the above procedure.

The electric conductivity of one or both emulsions is thereafter measured in dependence on the temperature.

Throughout, phase ratio refers to phase weight ratio.

At the PIT, an o/w emulsion changes over into a w/o emulsion, and vice versa, wherein the electric conductivity drops or rises jump-like. Precisely speaking, this is a temperature range of a few degrees Celsius. The temperature at which the electric conductivity has reached the mean value between the upper (o/w) and lower (w/o) level is recorded as the PIT.

The present invention relates to the use of carboxymethylated ethoxylates as the oil-mobilizing and emulsifying tensides. These compounds can be conventionally prepared according to German Pat. No. 2,418,444 by reacting ethoxylates of the formula $R-(O-CH_2-CH_2)_nOH$ with a salt of chloroacetic acid in the presence of alkali metal hydroxide or alkaline earth metal hydroxide. However, other manufacturing processes are likewise suitable.

R in this connection means a saturated or unsaturated, straight-chain or branched aliphatic, e.g., alkyl residue of 6-20, preferably 8-16 carbon atoms, or an alkylaryl residue of 3-14 carbon atoms in the alkyl residue such as alkylphenyl or dialkylphenyl. The aryl residue generally has 6-10 carbon atoms.

The symbol n can have values of 1 to 30, preferably of 1 to 20. Suitable cations include sodium, potassium, lithium, ammonium, calcium, or magnesium.

Suitable alcohols, the ethoxylates of which form the basis for the carboxymethylates, include, for example: hexyl alcohol, octyl alcohol, nonyl alcohol, decyl alcohol, undecyl alcohol, lauryl, tridecyl, myristyl, palmityl, and stearyl alcohol, and also unsaturated alcohols, such as, for example, oleyl alcohol. The alkyl chain can be normal or branched. With special advantage, commercial mixtures of these alcohols are employed, preferably with chain lengths which do not differ by more than 4 C-numbers. Alkyl phenols which can be utilized include, for example: butylphenol, pentylphenol, hexylphenol, octylphenol, nonylphenol, decylphenol, undecylphenol, dodecylphenol, tridecylphenol, tetradecylphenol, as well as the corresponding dialkylphenols such as dibutylphenol or dihexylphenol. The alkyl chain can be normal or branched. In particular, commercial mixtures of such alkyl phenols can be utilized, preferably with chain lengths which do not differ by more than 4 C-numbers.

The ethoxylation can be carried out in the presence of catalytic amounts of an alkali metal hydroxide of 1–30, preferably 1–20 moles of ethylene oxide per mole of hydroxy compound. The resultant mixtures exhibit approximately a Poisson distribution of homologs. In correspondence with the way they are produced, the carboxymethylated ethoxylates ordinarily still contain certain amounts of unreacted ethoxylate. Consequently, the formula R—(OCH$_2$—CH$_2$)$_n$—OCH$_2$—COOM in most cases means a mixture with differing amounts of unreacted ethoxylate. A degree of carboxymethylation can accordingly be defined. It has been found that mixtures having a degree of carboxymethylation of between 10% and 100%, e.g., 40–100%, preferably between 70% and 100% are capable of effectively displacing the oil. Especially effective are mixtures having degrees of carboxymethylation of 90–100%. The symbol % refers to percent by weight in all cases.

The aforedescribed mixtures of anionic and partially nonionic tensides, called carboxymethylated ethoxylates, are soluble or at least well dispersible in ordinary deposit waters, and no precipitations whatever are observed.

In selection of these mixtures, a suitable procedure of this invention is as follows. With knowledge of the deposit temperature or, if applicable, a temperature range, the PIT is measured for orientation from the crude oil, the formation water, as well as, if desired, the gas of the deposit, and a carboxymethylated ethoxylate of the above-mentioned formula which appears suitable. This measurement can be repeated if necessary with additional such tensides and, optionally, other additives.

The carboxymethylated ethoxylate is tailored to order on the basis of the measurement results from these routine preliminary tests. Its oil-mobilizing effectiveness for the respective deposit system can be verified by one or several routine preliminary tests in a sand pack as a model formation or using original drilled cores themselves. The sodium salts, among others, of the carboxymethylated ethoxylates, e.g., produced by reacting ethoxylates with chloroacetic acid in the presence of sodium hydroxide solution, offer several opportunities for "molecular architecture" with the goal of setting a desired phase inversion temperature in a specific system:

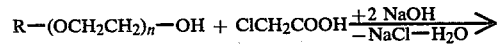

R—(OCH$_2$CH$_2$)$_n$—CH$_2$COONa

| R | n | Conversion |
|---|---|---|
| variable | variable | variable |

The salts of the carboxymethylated ethoxylates are composed, in principle, of three variable building blocks: the hydrophobic residue R, the ethoxylate chain (n), and the carboxymethyl group, the proportion of which in the resultant product mixture can be varied within wide limits by controlling the conversion of the starting ethoxylate with chloroacetic acid.

Suitable starting materials for the hydrophilic residue R include, for example, linear and branched (fatty) alcohols, or alkyl phenols with any desired alkyl residues.

Table 1 indicates the effect of the alkyl residue on the phase inversion temperature in a specific system:

TABLE 1

Dependence of PIT on Length of Alkyl Residue in the Sodium Salts of Carboxymethylated Fatty Alcohol Ethoxylates with 4.4 EO and with a Degree of Carboxymethylation (CM) of 65%; Crude Oil A (see D. Balzer and K. Kosswig, loc. cit.), Formation Water A (see D. Balzer and K. Kosswig, loc. cit.), Phase Ratio 1:1, 2% Tenside.

| C-Number in the Alkyl Residue | PIT (°C.) |
|---|---|
| 12 | 74 |
| 13(*) | 53 |
| 14 | 41 |
| 16 | 37 |

(*)1:1 Mixture of C$_{12}$ and C$_{14}$

The dependence of the phase inversion temperature of crude oil emulsions (see Table 1) on the degree of ethoxylation (EO) in carboxymethylated nonyl phenol ethoxylates (CM about 75%) in the EO degree range between about 5 and 7 is linear; the coefficient of about +30° C./EO degree is extraordinarily strongly pronounced.

The dependence of the PIT of this emulsion (crude oil A, formation water A, carboxymethylated nonylphenol ethoxylate with 6 EO, 2% tenside concentration) on the carboxymethylation degree (CM) is likewise linear in the range from 70% to 100% of special interest for the process of this invention. However, here the coefficient is merely about +0.5° C./% CM.

These dependencies demonstrate the variability offered by the class of carboxymethylated ethoxylates with regard to adaptation to a deposit.

The emulsion to be injected can now be prepared from the original crude oil, the formation water, the tenside, and, optionally, additives according to prevailing conventional methods of emulsion production (cf. P. Becher, Emulsions Theory and Practice, New York 1965, whose disclosure is incorporated by reference herein), and in this process no appreciably high shear forces are required. It is also possible to heat the mixture consisting of oil, water, tenside and the optional additives, to its PIT and by means of rapid cooling, stabilize the emulsion, which is then formed during gentle agitation and consists of very fine droplets. The emulsions are relatively stable at temperatures of ≧°15° C. below PIT; in some cases, a slight stirring in the storage vessel is recommended if very high salinities prevail.

For preparing the emulsion of this invention, instead of the original crude oil, it is also possible to utilize other crude oils, crude oil mixtures, partially refined crude oil fractions, gas oils, kerosene, or gasolines, as well as mixtures thereof with crude oil. Also, mixtures of pure C$_{5-30}$-hydrocarbons are suitable as the organic phase of the emulsion according to this invention; however, they will hardly ever be employed for economic considerations.

The volume of the emulsion to be injected, its phase ratio, its tenside content, and the amount and nature of additives, as well as the type and size of the mobility controlling polymer solution can be optimized with the aid of routine preliminary model flooding tests.

On the basis of these preliminary tests, the emulsion is introduced into the deposit with the aid of injection pumps. In this connection, the emulsion can be injected either continuously or in the form of a slug, i.e., a narrowly limited volume of 0.02 to 2 PV (=pore volume of the deposit). The size of the emulsion slug is dependent above all on the tenside concentration and on economic factors. The emulsifier concentration, based on the amount of aqueous phase, in general is 0.1–30%, preferably 0.1–20%. The phase ratio of the emulsion (oil/water) in general is 1:20 to 4:1.

Like all other conditions, amounts and details of the process of this invention, the amount of emulsion added is such that under the operating conditions of the invention for a given deposit, the PIT and other requirements of this invention are met. In general, all aspects of the process of this invention are fully conventional unless noted otherwise herein, and are described for example, in Chem. System Report No. 78–5. Process Evaluation - Research Planning, Enhanced Oil Recovery, whose disclosure is incorporated by reference herein.

Suitably, the emulsion flooding is preceded by water flooding, the produced formation water being utilized as the flooding liquid. The size of this water slug is 0.01–4 PV, preferably 0.05–1.0 PV. Following the emulsion slug, a polymer slug can be injected into the deposit for reasons of mobility control as well as for protecting the emulsion from penetrating formation water. For this purpose a polymer or polymer mixture is dissolved in such a concentration in the formation water that the viscosity is two to six times as high as that of the oil. For medium-salinity and higher-salinity deposits (1–28% total salinity), biopolymers are especially suitable, such as polysaccharides or cellulose derivatives. These still possess adequate viscosity in the presence of the increased salt concentrations and do not produce any precipitations.

For formation waters relatively poor in alkaline earth metal ions, it can prove to be advantageous to add soluble alkaline earth metal salts to the emulsion as well as to the precedingly and subsequently flooded-in formation water. Generally, their concentration in the respective slug is 0.1 to 3%. When adapting the tenside to the deposit, i.e. when measuring the PIT, these additives must be taken into account.

Suitably, the injection of the polymer solution is followed by normal water flooding. The latter is continued as long as oil can be recovered economically.

Other additives include cosurfactants like mono-, di- or trifunctional alcohols, for example iso-propanol, 1-butanol, n-butanol, tert-amylalcohol, 2-ethylhexanol, butyldiglycol, butyltriglycol, etc. These additives must be considered when adapting the tenside to the deposit, i.e. when measuring the PIT.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

This example demonstrates that crude oil emulsions produced with carboxymethylated nonylphenol ethoxylates are not broken up when flooded through an artificial formation. This is true despite the fact that constant water absorption (and oil absorption in oil extraction tests), and also, in particular, lowering of the tenside concentration due to adsorption processes, constitute a high burden on stability. To produce the artificial formation, a thermostat-equipped high-pressure pipe having a length of 70 cm and a diameter of 5 cm, provided with a temperature measuring unit and manometer and sealable at both ends by threaded closures with capillary inlet and pressure-maintaining valve outlet, was charged with edge-rounded quartz sand. Thereafter, the sand pile was saturated using a high-pressure metering pump with formation water A. The desired temperature was set by means of a thermostat.

Using a pressure pickup transducer, the permeability of the sand pile was determined. This model formation was injected at a flooding rate of about 1 m/d with 0.44 PV (1 PV about 750 ml) of an emulsion consisting of crude oil A, formation water A (phase ratio 1:1), and 9.4 g (5.5% based on the aqueous phase) of carboxymethylated nonyl phenol ethoxylate with about 6 moles of ethylene oxide per mole and with a degree of carboxymethylation (CM) of about 80%. At the same flooding rate, 0.4 PV of polymer solution and, thereupon, about 3 PV of formation water A were then flooded in.

The deposit temperature was 55° C. and, thus, within the range of the PIT (about 56° C.), which represented an additional burden on the stability of the emulsion. The deposit pressure was 60 bar, the porosity of the artificial formation was about 47% and its permeability about 1,110 mD [=milli-Darcys]. The formation water A contained about 20% NaCl, 0.1% KCl, 1.2% $CaCl_2$, and 0.4% $MgCl_2$. The polymer employed was hydroxyethylcellulose (0.25%, dissolved in formation water A; viscosity at 25° C. about 60 mPa.s). The crude oil was a paraffin-base oil with $n_D{}^{20} \sim 1.486$, $\rho_{20} \sim 0.863$ g/cc, and $\eta_{20} \sim 19$ mPa·s. Of 172 ml of oil flooded into the sand charge as an emulsion, 1.6 ml could be separated, and 117 ml could be produced in emulsified form. However, only 3.6 g of tenside was removed by flooding. In the sand charge, as was determined analytically, were 46 ml of crude oil and 5.4 g of tenside—in a relatively homogeneous distribution.

EXAMPLE 2

An artificial formation was produced as in Example 1, saturated with formation water A, and its permeability was measured. Thereafter, the charge was saturated with crude oil A, determining the bound water content at the same time. At this point, water flooding was commenced with a flooding rate of about 2 m/d. After introducing about 1.5 PV of formation water by flooding, reaching a water dilution degree of 98–100%, the emulsion was injected as a slug. There followed, as a slug, the polymer solution (0.4 PV) and about 3.0 PV of formation water. Flooding with tenside, polymer, and thereafter with formation water took place with a flooding rate of about 1 m/d.

The porosity of the formation was 49%; permeability was 1,600 mD, bound water content was 26%, and deposit temperature was 46° C.

0.44 PV of an emulsion (crude oil A, formation water A, phase ratio 1:1, 10.1 g [6.6% based on the aqueous phase] of carboxymethylated nonylphenol ethoxylate with 5.5 moles of ethylene oxide per mole, degree of carboxymethylation about 80%) was utilized. The PIT of this emulsion was 49° C. By water flooding, an oil extraction of 76% was attained which, after injecting another 1.3 PV after beginning of the emulsion flooding, could be raised by 24% to 100% total oil extraction, the water dilution values receding down to 40%. During transport of the oil bank produced by the emulsion, an average pressure gradient was measured of 0.5 bar/m.

Analysis revealed 4.5 g of tenside, distributed over the sand charge in a relatively homogeneous fashion.

EXAMPLE 3 (COMPARATIVE EXAMPLE)

In this example, tertiary oil extraction was obtained by normal tenside flooding.

A formation as in Example 2 was prepared, wetted with formation water A, and saturated with crude oil A (porosity 48%, permeability 1,200 mD, bound water content 24%, deposit temperature 44° C.). Water flooding yielded an oil extraction of maximally 77%. By flooding in 0.2 PV of tenside solution (10.3 g of carboxymethylated nonylphonyl ethoxylate with about 5.5 moles of ethylene oxide per mole, CM about 80%, dispersed in formation water A, PIT of the crude oil emulsion 49° C.) followed by polymer solution and formation water as in Example 2, the oil extraction could be raised by 19% to 96% after another 1.4 PV starting from commencement of tenside flooding. During transport of the oil bank produced by the tenside in the formation, an average pressure gradient was measured of 0.6 bar/m. After the flooding test, an amount of tenside of 7.3 g was found in the artificial formation. This is a markedly higher retained amount than in Example 2.

EXAMPLE 4 (COMPARATIVE EXAMPLE)

This comparative example was conducted under practically identical conditions, with practically identical materials and process steps as in Example 2, but with a deposit temperature set at 60° C. (PIT was 49° C. as in Example 2). By water flooding, an oil extraction of 76% was obtained, which could be increased after another 1.2 PV after beginning of emulsion flooding, to a total oil extraction of 100%. However, an average pressure gradient of 19 bar/m was measured.

Such a pressure gradient would, if applied in the field, lead to pressures far above the petrostatic pressure and thus would preclude the use of the tensides in tertiary oil recovery.

EXAMPLE 5

With practically identical conditions and process steps as in Example 2, this example was carried out with 0.5 PV of an emulsion consisting of 86% of n-dodecane and 14% of toluene (% by weight), formation water A (phase ratio 1:1), and 12 g (6.6%) of carboxymethylated nonylphenol ethoxylate with 5.5 moles of ethylene oxide per mole and a degree of carboxymethylation of about 80%. The deposit temperature was 46° C.; the PIT's of the injected emulsion as well as of the deposit system A were both 49° C. By water flooding, an oil extraction was obtained of 78%, which was increased to a total oil extraction of 100% after another 1.2 PV after beginning of the emulsion flooding. During tertiary oil recovery, an average pressure gradient was measured of 0.8 bar/m.

EXAMPLE 6

A more densely packed, artificial formation was produced analogously to Example 2, wetted with formation water A, and saturated with crude oil A (porosity 42%, permeability 310 mD, 26% bound water content, deposit temperature 53° C.). After water flooding, leading to an oil extraction of 69%, an emulsion slug of 0.25 PV, consisting of crude oil A, formation water A (phase ratio 1:1), and 5.3 g of carboxymethylated nonylphenol ethoxylate (6.6%) with about 6 moles of ethylene oxide per mole and with a degree of carboxymethylation of 99% (PIT of the crude oil emulsion 56° C.) was injected at a flooding rate of about 1.1 m/d, followed as in Example 2 by 0.4 PV of polymer solution and about 3 PV of formation water. By means of the emulsion, a total oil extraction of 100% was attained after about 1.3 PV after beginning of emulsion flooding. During transport of the oil bank through the formation, an average pressure gradient of about 1.5 bar/m was recorded. After flooding, 3.2 g of tenside was detected in a homogeneous distribution throughout the sand charge.

EXAMPLE 7

A formation similar to that in Example 6 (porosity 42%, permeability 240 mD) was wetted with formation water B and thereafter saturated with crude oil B. The bound water content was 26%, the temperature was 41° C. After flooding with formation water B, leading to an oil extraction of 68%, an emulsion slug of 0.3 PV, consisting of crude oil B, formation water B (phase ratio 1:1) and 7 g of carboxymethylated nonylphenol ethoxylate (6.6%) with about 5 moles of ethylene oxide per mole and a degree of carboxymethylation of 97% (PIT of the crude oil emulsion 43° C.), was injected at a flooding rate of 1.2 m/d, followed, analogously to Example 2, by a polymer slug and thereafter flooding with formation water B. By means of the emulsion, after about 1 PV starting with commencement of the emulsion flooding, a total oil extraction was attained of 100%, the water dilution receding to 20%. An average pressure gradient of about 2 bar/m was measured.

Formation water B contained about 10% NaCl, 2.2% $CaCl_2$, 0.5% $MgCl_2$ and minor amounts of KCl and $SrCl_2$. Crude oil B was paraffin-base, $n_D^{20}$:1,480; density $\rho_{20} \approx 0.86$; viscosity $\eta_{20} \approx 9$ mPa·s.

EXAMPLE 8

A formation similar to that of Example 2 (porosity 43%, permeability 1,400 mD) was wetted with formation water A and subsequently saturated with crude oil A. The bound water content was 27%, the testing temperature was 54° C. After flooding with formation water, leading to an oil extraction of 72%, an emulsion slug of 0.3 PV, consisting of crude oil A, formation water A (phase ratio 1:1), and 73 g (=6.6%) carboxymethylated "Alfol" 1214 ethoxylate with 4.5 moles of ethylene oxide per mole, CM 94%, PIT 56° C., was injected at a flooding rate of 1.2 m/d, followed analogously to Example 1 by 0.4 PV of polymer solution and about 3 PV of formation water. By means of the emulsion, after about 1.3 PV, a total oil extraction of 100% was attained. An average pressure gradient was measured of about 0.9 bar/m.

EXAMPLE 9

A formation similar to that of Example 2 (porosity 41%, permeability 650 mD) was wetted with formation water A and subsequently saturated with crude oil A. The bound water content was 21%, the testing temperature was 61° C. After flooding with formation water, leading to an oil extraction of 68%, there was injected 0.3 PV of an emulsion slug consisting of crude oil A, formation water A (phase ratio 1:1), and 7.2 g (6.6%) of carboxymethylated "Alfol" 16 ethoxylate with 7 moles of ethylene oxide per mole, CM 90%, (PIT 65° C.) at a flooding rate of 1.2 m/d, followed by 0.4 PV of polymer solution, cf. Example 1, and about 3 PV of formation water A. A total oil extraction of 87% was obtained; the average pressure gradient was about 0.8 bar/m.

Recovery of the tertiary oil took place in Examples 2-9 extensively emulsion-free, since tenside breakthrough occurred only after flooding out of the oil bank.

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

We claim:

1. A process for recovering extensively emulsion-free oil from a subterranean deposit of medium or high salinity comprising injecting a water-oil emulsion into an injection well wherein the emulsifier comprises an effective amount of a mixture of 0-90 wt. % of ethoxylates of the formula $$R-(OCH_2CH_2)_nOH$$

and 100-10 wt. % of carboxymethylated ethoxylates of the formula $$R-(OCH_2CH_2)_n-OCH_2-COOM$$

wherein
R is a hydrocarbon aliphatic group of 6-20 carbon atoms or a mono- or dialkylphenyl group of 3-14 carbon atoms in the alkyl group,
n is 1 to 30, and
M is an alkali or alkaline earth metal ion or ammonium,
wherein said emulsifier is selected so that the phase inversion temperature of the system:deposit oil/formation water/emulsifier lies 0°-10° C. above the deposit temperature.

2. A process of claim 1, wherein the phase inversion temperature of the system:crude oil/formation water/emulsifier lies 1°-5° C. above the deposit temperature.

3. A process of claim 1, wherein the emulsifier concentration in the emulsion is 0.1-30%, based on the weight of the aqueous phase.

4. A process of claim 1, wherein the formation water of the deposit is used as the aqueous phase of the emulsion and the crude oil of the deposit is used as the organic phase of the emulsion.

5. A process of claim 4, wherein alkaline earth metal salts soluble in formation water are also injected in concentrations of 0.1 to 3 wt. %.

6. A process of claim 1, wherein the phase inversion temperature of the emulsion which is injected lies 0-10° C. above the temperature of the deposit.

7. A process of claim 1, wherein prior to injection of the emulsion, 0.05-4 pore volumes of formation water are injected into the deposit.

8. A process of claim 1, wherein after injecting the emulsion, formation water is injected into the deposit.

9. A process of claim 8, wherein the formation water injected after the emulsion contains a viscosity raising polmer.

10. A process of claim 1, wherein the amount of carboxymethylated ethoxylate in the emulsifier is 40-100 wt. %.

11. A process of claim 1, wherein the amount of carboxymethylated ethoxylate in the emulsifier is 70-100 wt. %.

12. A process of claim 1, wherein the phase inversion temperature lies 1°-10° C. above the deposit temperature.

* * * * *